United States Patent
Venolia et al.

(10) Patent No.: US 11,164,418 B2
(45) Date of Patent: Nov. 2, 2021

(54) IMPROMPTU COMMUNITY STREAMER

(71) Applicant: Microsoft Technology Licensing, LLC, Redmond, WA (US)

(72) Inventors: Gina D. Venolia, Bellevue, WA (US); John C. Tang, Palo Alto, CA (US); Kori Inkpen, Redmond, WA (US); William A. Hamilton, College Station, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 16 days.

(21) Appl. No.: 16/294,437

(22) Filed: Mar. 6, 2019

(65) Prior Publication Data
US 2019/0251782 A1    Aug. 15, 2019

Related U.S. Application Data

(63) Continuation of application No. 15/013,753, filed on Feb. 2, 2016, now Pat. No. 10,270,820.

(60) Provisional application No. 62/206,597, filed on Aug. 18, 2015.

(51) Int. Cl.
*G07F 17/32* (2006.01)
*G06F 16/40* (2019.01)
(Continued)

(52) U.S. Cl.
CPC .......... *G07F 17/3227* (2013.01); *G06F 16/40* (2019.01); *G06Q 30/02* (2013.01);
(Continued)

(58) Field of Classification Search
CPC ............. G07F 17/3227; G07F 17/3211; G07F 17/3216; G07F 17/3225; G07F 17/3224; G07F 17/3276; G07F 17/3293
See application file for complete search history.

(56) References Cited

U.S. PATENT DOCUMENTS

| 5,405,151 A * | 4/1995 | Naka | A63F 13/10 |
| | | | 463/31 |
| 9,002,937 B2 * | 4/2015 | Levien | H04L 67/2823 |
| | | | 709/204 |

(Continued)

FOREIGN PATENT DOCUMENTS

| CN | 103023965 A | 4/2013 |
| CN | 103621106 A | 3/2014 |
| CN | 104838413 A | 8/2015 |

OTHER PUBLICATIONS

"Office Action Issued in European Patent Application No. 16748426.0", dated Mar. 2, 2020, 4 Pages.

(Continued)

*Primary Examiner* — Omkar A Deodhar
*Assistant Examiner* — Matthew D Hoel
(74) *Attorney, Agent, or Firm* — International IP Law Group, PLLC

(57) ABSTRACT

Various systems and methods for streaming an impromptu community are described herein. In one example, a system for streaming impromptu communities includes a data storage device, a community analyzer, and a publisher. In an example, the data storage device can store a number of incoming data sets, wherein each data set identifies a time and location for the origin of the data, a media instance, and an identification of an origin device or origin user. In an example, the community analyzer can operate from the data storage device to use a processor in order to calculate an IC boundary and generate an impromptu community (IC) indicator based on the proximity and temporality of the number of incoming data sets. In an example, the processor can modify the number of data sets to include the IC indicator.

20 Claims, 7 Drawing Sheets

(51) Int. Cl.
*G06Q 30/02* (2012.01)
*G06Q 50/00* (2012.01)
*H04L 29/06* (2006.01)
*H04W 4/02* (2018.01)

(52) U.S. Cl.
CPC ..... *G06Q 30/0241* (2013.01); *G06Q 30/0251* (2013.01); *G06Q 50/01* (2013.01); *G07F 17/3211* (2013.01); *G07F 17/3216* (2013.01); *G07F 17/3225* (2013.01); *G07F 17/3244* (2013.01); *G07F 17/3276* (2013.01); *G07F 17/3293* (2013.01); *H04L 65/4061* (2013.01); *H04W 4/023* (2013.01)

(56) References Cited

U.S. PATENT DOCUMENTS

| | | | | |
|---|---|---|---|---|
| 9,351,118 | B2* | 5/2016 | Crutchfield | H04W 4/023 |
| 9,436,708 | B2* | 9/2016 | Thakkar | G06F 16/27 |
| 9,473,745 | B2* | 10/2016 | Filip | H04N 7/18 |
| 9,477,943 | B2* | 10/2016 | Levien | G06Q 10/10 |
| 9,582,516 | B2* | 2/2017 | McKinnon | G06F 16/58 |
| 9,589,189 | B2* | 3/2017 | D'Argenio | G06K 9/00671 |
| 9,866,513 | B2* | 1/2018 | Halliday | H04L 51/20 |
| 9,924,310 | B2* | 3/2018 | Blakeslee | H04L 67/18 |
| 10,257,128 | B2* | 4/2019 | Tang | H04L 12/1813 |
| 10,270,820 | B2* | 4/2019 | Venolia | G06Q 50/01 |
| 2013/0040660 | A1* | 2/2013 | Fisher | G06K 9/50 455/456.1 |
| 2015/0058957 | A1* | 2/2015 | Halliday | H04W 12/06 726/7 |

OTHER PUBLICATIONS

"First Office Action and Search Report Issued in Chinese Patent Application No. 201680047335.6", dated Jul. 5, 2021, 22 Pages.

* cited by examiner

IMPROMPTU COMMUNITY STREAMER

CROSS-REFERENCE TO RELATED APPLICATIONS

The present application claims the benefit of U.S. Provisional Patent Application Ser. No. 62/206,597, filed Aug. 18, 2015, and is also a continuation of U.S. patent application Ser. No. 15/013,753, filed Feb. 2, 2016, and entitled "IMPROMPTU COMMUNITY STREAMER", the disclosure of which is incorporated by this reference as though fully set forth herein.

BACKGROUND

Commercial social media currently focuses on display of particular media instances including photos, videos, and texts combined with a mechanism for following and being followed by individual people and groups.

Some social media applications allow for remote people to view live media instances of a location or a connected resource that features live media content. Other social media aggregators and applications identify events after-the-fact from social media postings to allow viewers to see media instances from the event.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An example provides a system for streaming an impromptu community including a data storage device, a community analyzer, and a publisher. In an example, the data storage device can store a number of incoming data sets, wherein each data set identifies a time and location for the origin of the data, a media instance, and an identification of an origin device or origin user. In an example, the community analyzer can operate from the data storage device to use a processor in order to calculate an IC boundary and generate an impromptu community (IC) indicator based on the proximity and temporality of the number of incoming data sets. In an example, the processor can modify the number of data sets to include the IC indicator. In an example, the publisher located on the data storage device and connected to a network interface can direct the exchange of communications received at the data storage device from and to devices and users sending data sets comprising an IC indicator.

Another example provides method for streaming an impromptu community including storing, with a data storage device, a number of incoming data sets, where each data set identifies a time and location for the origin of the data, a media instance, and an identification of an origin device or origin user. In an example, the method can include generating, with a community analyzer located on a data storage device and a processor, an impromptu community (IC) indicator based on the proximity and temporality of the number of incoming data sets. In an example, the method can modify with the processor, the number of data sets stored in the data storage device, to include the IC indicator. In an example, the method can include managing the exchange of communications at the data storage device both from and to devices and users sending data sets comprising an IC indicator.

In an example, a system for streaming an impromptu community includes a user device and a coordinating server. In an example, the user device includes a data set generator interface to generate a data set including a media instance, location of origin data, time of origin data, and user device information. In an example, the user device includes a transmitter to transmit the data set to the coordinating server. In an example, the coordinating server can include a data storage device to store the data set and a community analyzer to modify the number of data sets to include an IC indicator based on temporality and proximity of the data set to a second data set or group of data sets. In an example, the coordinating service can include a publisher connected to the data storage device to stream each media instance with an IC indicator and manage the exchange of communications at the data storage device both from and to the user device.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
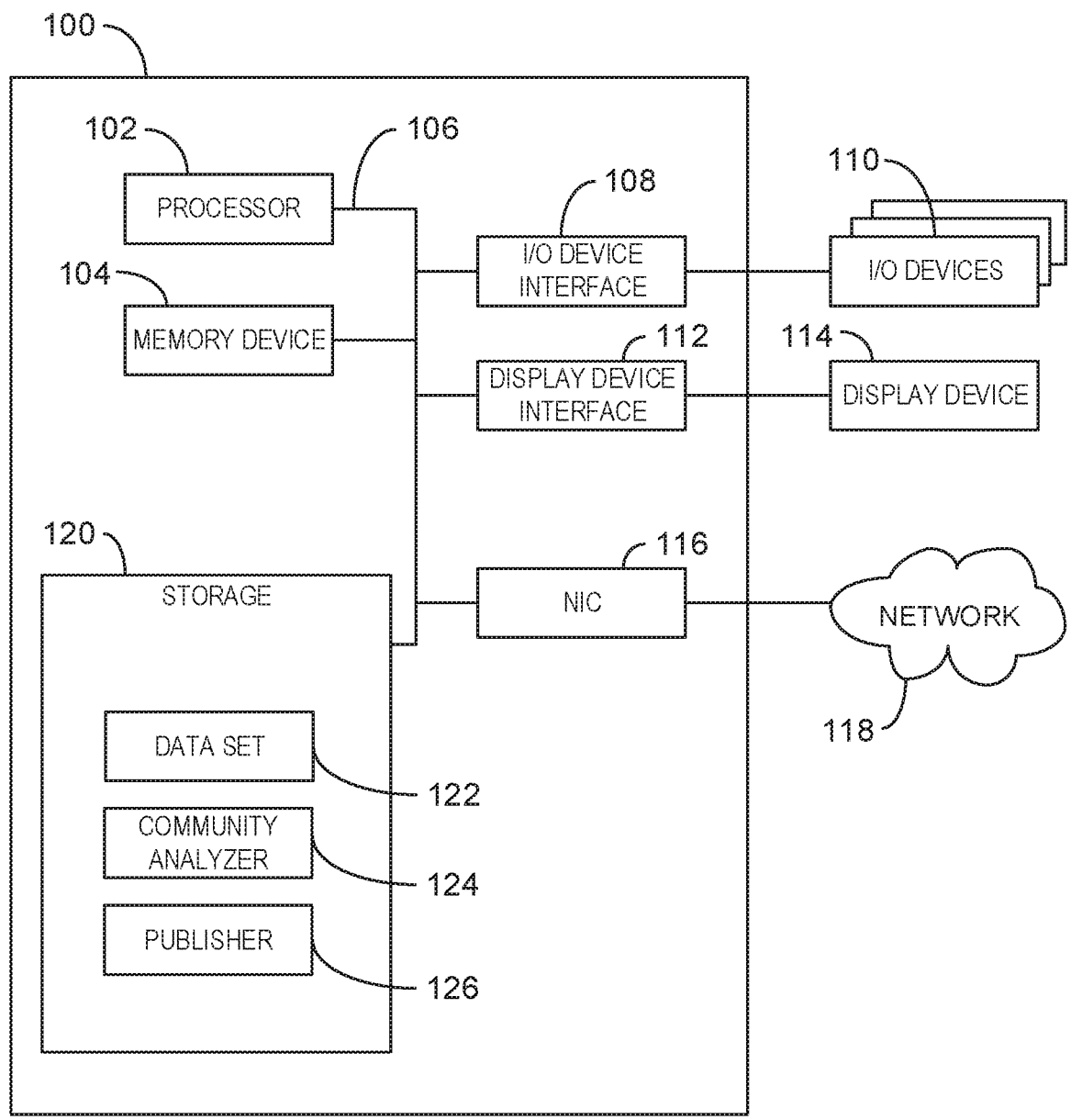
FIG. 1 is a block diagram of an example computing system that can stream an impromptu community.

Techniques for integrating across media platforms and while enabling people to identify events of interest and interact with each other around the event are disclosed herein. The streaming of an impromptu community and its messages, video, audio, and other similar media can include first the formation of an impromptu community based on location and time of an activity in a certain location. Once formed, the present techniques disclosed herein allow users within the impromptu community to interact directly with each other in a variety of ways. These interactions can take many forms including text, audio, video, generated graphics or any other number of interactions that themselves maybe interacted with by other members of the impromptu community.

Social media technologies can enable many people to share their perspectives on events to their followers, however, as people participate in real world events and publish various forms of social media across platforms including video live streams, short video clips through phone applications, photos through applications, or text through application or semi-public group texting and typing in networked communities via phone or computer. As the number of social media applications and methods of sharing grow, the number of sources of media for a single event emerge.

Viewers who are interested in remotely experiencing an event in real-time through social media might find individual social media streams from the event through people they follow or by browsing a list curated by an application, however, people currently are not able to discover and browse a complete collection of social media streams published for the event without first seeking or manually discovering the accounts hosting the publication of media for this event. Further no ability interacts with media instances across platforms for multiple formats based on location and time based impromptu grouping.

In the present disclosure, social media streams can be identified as originating from the same general place and time. In an example, the social media streams can be based on content, including symbol usage by a user including hashtags or 'at' signs preceding a word or phrase. In an example, social media streams can be based on other suitable metadata such as author information a language setting of the social media or other another suitable metadata setting. In an example, based on the identification of a larger than usual amount of media instances streaming from a particular location, a system can collect any of these streaming accounts and instances into an "impromptu community" of people who publish and view social media from that event. The creation of an impromptu community can occur in a separate application which can be connected to a remote storage site such as a server or cloud of servers receiving data from a number of social media streams.

In an example, this allows publishers and viewers who share an interest in the same event to be aware of the collection of other social media covering the same event. In an example, this can also provide all viewers, whether located at the event, or remote, to get a bigger picture of the community around the event without regard for social media platform choice of each individual.

The present disclosure also allows integrating across various kinds of social media interactions, including affirmations, negative indications, text comments, the ability to share, the ability to save a link to the media, the ability to locally save the media instance, the ability to report the media instance, and other similar interactions. The present disclosure further enables communication channels between the impromptu communities exclusive from other social media platforms, including a global text chat communication among all publishers and viewers of an event and a push-to-talk audio among viewers of a specific publishing stream. Push-to-talk can also include "push-to-video" functionality which allows a user to interact with the community through a video communication channel. In an example, a viewer within the impromptu community can activate a camera on their device to intact with a number of users or an initial broadcaster for an impromptu community.

In an example, the ability to subgroup these direct, local, and sometimes temporary groups enables coordination among the members interested in the event. In an example, this can allow users to participate on social media during an event without the need to find or identify leaders in a particular social media platform to follow.

In an example, the present disclosure integrates across social media to discover in real time events of public interest. In an example, the identification of a cluster of social media information within some geographical and temporal proximity, enables people who may be interested in the proximately and temporally close events to view and interact with other people currently participating in the event.

In an example, the present disclosure includes a system that can, upon discovering an event of interest, generate an "impromptu community" from the both the people participating in the event and publishing social media and the people interested in viewing and interacting with the participants. In an example, the presently disclosed system allows the viewers to interact in appropriate ways through push-to-talk audio, event-wide text messages, social media element level text messages, stream level text messages, and affirmations such as "like" indicators or hearts.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one example, the various components may reflect the use of corresponding components in an actual implementation. In other examples, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from the illustrations herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein can be intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example computing system that can stream an impromptu community. The computing system 100 may be, for example, a networking server, blade server, a mobile phone, laptop computer, desktop computer, or tablet computer, among others. The computing system 100 may include a processor 102 that can be adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to project a remote object.

The processor 102 may be connected through a system bus 106 (e.g., PCI, ISA, PCI-Express, NuBus, etc.) to an input/output (I/O) device interface 108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that can be a built-in component of the computing system 100. The display device 114 may also include a computer monitor, television, or projector, among others, that can be externally connected to the computing system 100. A network interface card (NIC) 116 may also be adapted to connect the computing system 100 through the system bus 106 to a network 118.

The storage 120 can be a data storage device that includes a hard drive, an optical drive, a USB flash drive, an array of drives, or any combinations thereof. The storage 120 can include a data set 122, which can be stored at least partially in hardware logic. In an example, the data in a data set 122 can include data stored from a previous event, or that a computing system 100 has received from the NIC 116 and network 118 or an I/O device 110 in real time from an event. In an example, the data set 122 can include a media instance, a time and location for the origin of the media instance, and an identification of an origin device or origin user of the data set or media instance. In an example, the data storage device, or storage 120 can identify the data in the data set 122 for the computing system 100. The storage 120 can also include a community analyzer 124 that can, in some examples, be at least partially made of hardware logic. The community analyzer 124 can generate an impromptu community (IC) boundary and IC indicator based on the proximity and temporality of the data sets. The proximity and temporality information can be generated by a comparison of data sets location information compared to all the others, or compared to a historical average for a particular area or time frame. If a particular pattern for location and time can be beyond a particular threshold, it can be determined by a community analyzer that an even can be occurring and can establish an IC boundary. In an example, the IC boundary can be geographic. In an example, the IC boundary can be temporal. In an example the IC boundary can be based on type of media platform, media generating device, or by artificial boundaries such as country and state lines. In an example, the community analyzer 124 can generate an IC indicator to later use in modifying the data sets that originally delivered the media instance. In an example, the IC indicator can be added to data sets as a means to identify which media instances can be shown in which media platforms, locations, or languages. The computing system 100 can also include a publisher 126 that can be at least partially made of hardware logic, to stream each media instance with an IC indicator to an origin device and an origin user. In an example, the publisher 126 can also store the data in the connected data storage device 120 for later access by any device with the IC indicator information.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the data set 122, community analyzer 124, and publisher 126 can be partially, or entirely, implemented in hardware and/or in the processor 102. For example, the functionality may be implemented with an application specific integrated circuit, in logic implemented in the processor 102, or in any other device.

Figure 2:
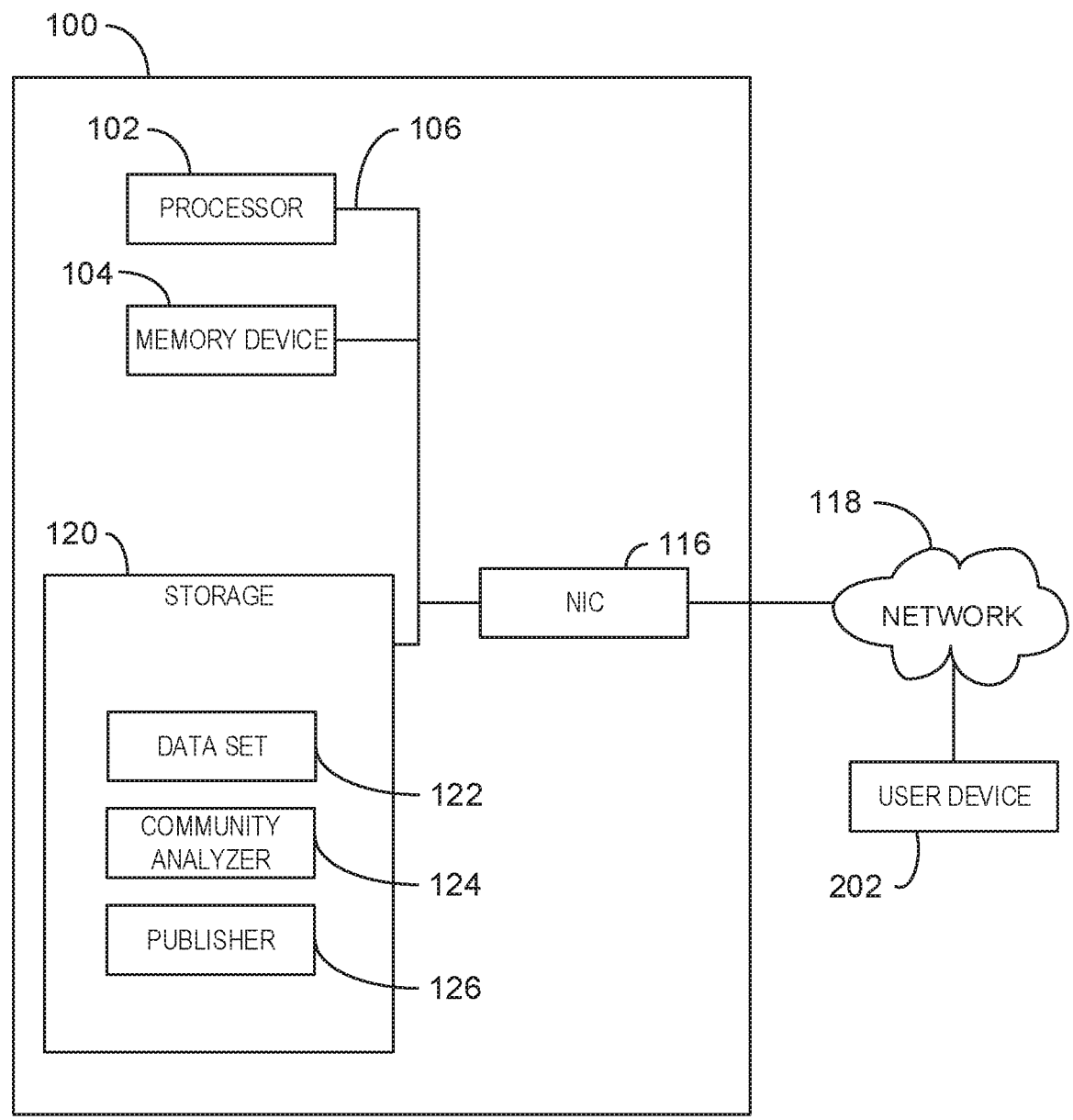
FIG. 2 is a block diagram of an example simplified computing system that can stream an impromptu community and a connected user device.

FIG. 2 is a block diagram of an example simplified computing system 200 that can stream an impromptu community and a connected user device. Like numbered items are as described in FIG. 1.

As discussed above, the example computing system 100 can be a networking server or a blade server and can function in FIG. 1. In an example, the computing system 100 can be connected to a network 118 through a NIC 116. In an example, the network 118 can also be connected to a user device 202. The user device 202 can be a device similar to the computing system 100. In an example, the user device 202 be a smartphone and can generate a data set 122 to be sent through the network 118 to the computing system 100 and stored in the storage 120. This generation can be done by an I/O device 110 such as a camera located in the user device or can also be done by simple input of text into a keypad or other suitable input technique on the user device. In an example a picture or text generated by the user device 202 can include location and time data in the content data or the metadata of the text file, the picture file, the video file, or whatever file or data structure can be used to share a media instance either as a raw file or as a social media post. In an example, the user device 202 can also generate data that uniquely identifies the specific user device 202 where the data set 120 can be generated, or the specific user who can be using the device, prior to sending this information to the computing system 100 over the network 118.

While FIG. 2 shows only a single user device 202, multiple user devices 202 can be connected to a network 118 and to a computer system 100 for streaming to an impromptu community. Indeed, the larger the number of users devices 202 the larger the potential community. When multiple user devices 202 are connected to a computer system 100, they can each send, and the computer system 100 can receive, a data set. In an example, the multiple data sets received by the computing system 100 can allow a community analyzer 124 to compare the location and time data contained in each data set 122 received from each user device 202. By this comparison, a community analyzer 124 can identify large peaks of activity in a particular location or time. The distance and time information gathered from each data set 122 from the user devices 202 can also be compared to historical averages for a particular area or time. In an example, a community analyzer 124 can recognize an event for forming an impromptu community based on the size of the area of user device 202 activity, as well as the frequency of user device activity 202 in that area. In an example, the larger the area in question, the more frequent the activity needed for a community analyzer 124 to designate an impromptu community for the user devices 202 in that particular area. In an example, the community analyzer's 124 designation of an impromptu community (IC) includes the designation of an IC boundary as well. An IC boundary can vary in geographic size, temporal size, or can be limited by any other arbitrary limits, e.g. county, state, or country borders.

In an example, when an IC boundary can be established, a publisher 126 can reference the boundary location and the previously recorded location information from a user devices' 202 data set. From a comparison of these two values, a community analyzer 124 can determine if a user device 202 can be within the IC boundary and if the publisher 126 may be likely to include the user device 202 when including media instances from various user devices 202 in the IC boundary to be published. Similarly, devices can be given an IC boundary in terms of temporal boundaries such that even if they are in a particular geographic zone, the time since an IC has been formed may have passed, and thus a publisher 126 may not publish the media instances from a user device 202.

It is to be understood that the block diagram of FIG. 2 is not intended to indicate that the simplified computing system 200 is to include all of the components shown in FIG. 2. Rather, the computing system 2 can include fewer or additional components not illustrated in FIG. 2 (e.g., additional applications, additional modules, additional memory devices, additional network interfaces, etc.). Furthermore, any of the functionalities of the data set 122, community analyzer 124, and publisher 126 can be partially, or entirely, implemented in hardware and/or in the processor 102. For example, the functionality may be implemented with an application specific integrated circuit, in logic implemented in the processor 102, or in any other device.

In an example, a linking manager can be connected to the data storage device and a network to direct the exchange of communications that can go beyond the more simple interactions such as "likes" or "comments." In an example, these communications can include push-to-talk audio or global text groups formed based on the IC. In an example, the exchange of communications can take place through the use of a data set and can also take place on a communications server or a data storage device.

In an example, the data storage device can generate an IC event collection based on the streamed media instances, time published tag, and interactions. In this example, the IC event collection can include the storage of these media instances, or links to these media instances in order to generate a representation of these instances for later viewing and interaction after the real-time event has occurred or for viewers who have arrived or joined the IC after the start of the event and wish to catch up on what was missed.

In an example, the publisher 126 can also store each media instance with an IC indicator in the data storage device rather than, or in addition to pushing the media instances to user devices. In this example, the media instances can be accessed by any devices with the IC indictor information. The IC indicator information can be an uniform resource locator, a unique search term, a hash, or any other suitable unique identifier that can direct a user device to a particular media instance or media stream.

Figure 3:
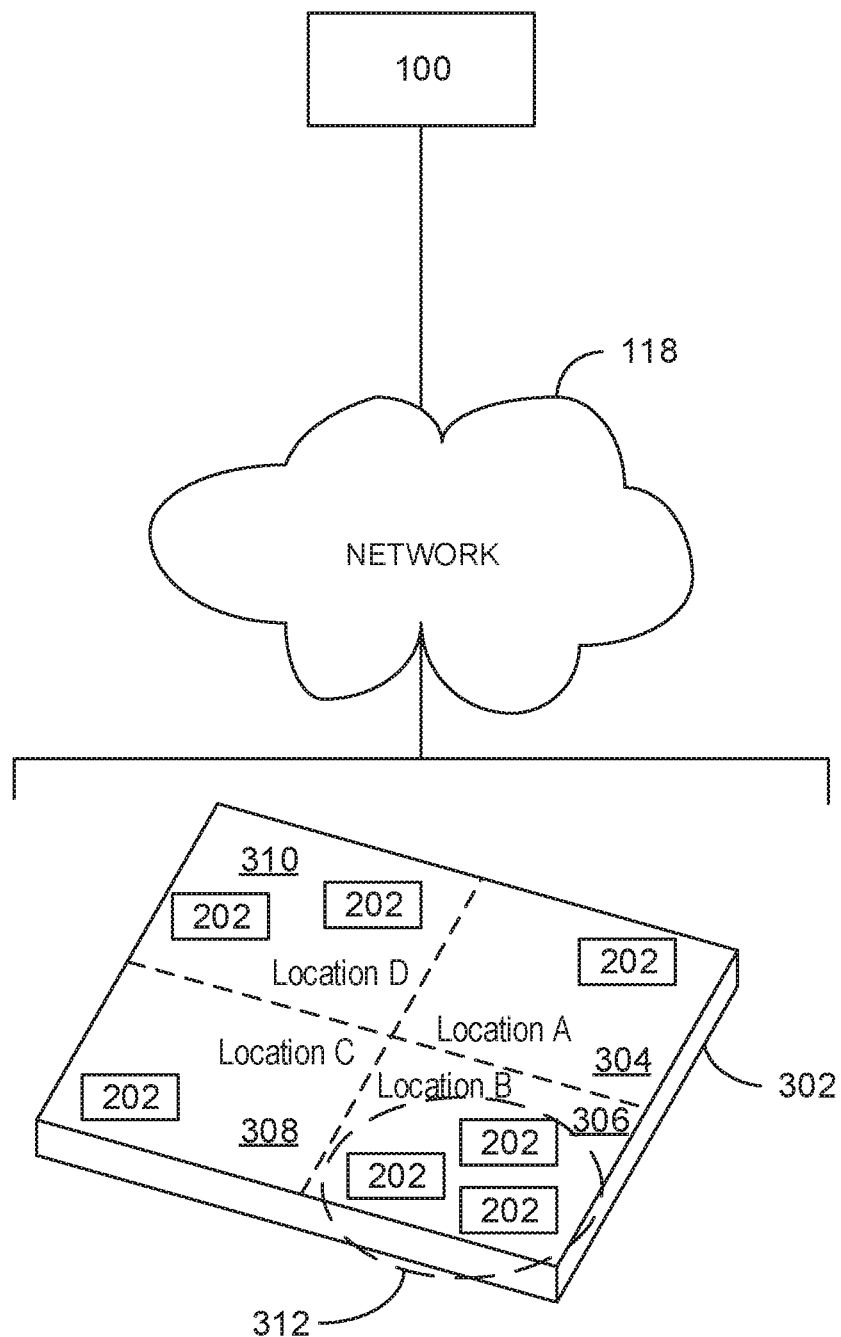
FIG. 3 is a block diagram of an example overview of a system for streaming an impromptu community based on time and location of the user devices.

FIG. 3 is a block diagram of an example overview of a system 300 for streaming an impromptu community based on time and location of the user devices. Like numbered items are as described in FIGS. 1 and 2.

In an example, a plurality of user devices 202 can be in a variety of locations in physical space 302. In an example, the physical space 302 can be the geographic or physical world, and users with their user devices 202 can move around this space in a variety of directions, groupings, and for a number of reasons. In an example, the groupings of user devices can be planned, as in a planned conference with a custom built user device application for login, registration, and joining of the group to enable communication between group members. In impromptu communities that can be formed, however, the groups of people may not be connected to each other or even know each other. In an example, the physical space 302 can have a number of locations. For example, one user device 202 can be located in location A 304, 3 user devices 202 are located in location B 306, one user device 202 can be located in location C 208, and 2 user devices 202 are located in location D 310. In an example, a computer system 100 for streaming impromptu communities can first identify a number of user devices 202 that can belong to an impromptu community (IC). This can be done by gauging a level of activity of a number of user devices 202 in a close proximity or close temporality to each other. In FIG. 3, if each of the user devices 202 being shown shares a media instance or otherwise activates in a similar time frame, the computer system 100 can identify this, along with location and time information, and designate the user devices 202 in a particular location as qualifying to be in an IC. In this example, as three figures are shown sharing, interacting, or otherwise being active from location B, the computer system 100 can assign these user devices 202 to an IC boundary 312. In an example the location B 306 can be a number of sizes and can be a number of shapes based on the number of interactions within the area in question.

In an example, when an IC forms, the data set 122 of each user device 202 can be modified at the computer system 100 to include an IC indicator. In an example, the IC indicator can identify the media instances from these user devices 202 and share these media instances in a unified thread, to a publicly accessible webpage, to an application, back to the users in an organized feed, or other similar solutions. In an example, the media instances of user devices 202 are each stored in the data storage device 120 but can be accessed through an interface generated by the publisher 126 that allows the searching of an indexed data storage device 120 through the publisher 126. In an example, these indexed searches can include IC indicators to find events or ICs directly.

In FIG. 3, only a subset of user devices 202 can be selected as being within the IC boundary 312. In an example, however, there can be a subset of user devices 202 given an IC indicator. In this example, the creation of a subset of user devices 202 can aid in management of a stream if the number of users in an impromptu community becomes unwieldly. In another example, the modification of an IC to a subset of user device 202 can be used by law enforcement, or rescue teams when a large number of people exist in danger in the same area—potentially leading to the creation of an IC. In this example, a subset of user devices 202 manually given an IC boundary or inclusion in an IC can allow the transmission of valuable emergency mitigating information without needing the number or contact information of any user devices in the area. Further, if the number of IC indications can be limited, communication can improve to users attempting to access a stream with the relevant IC information or within the IC boundary.

Figure 4:
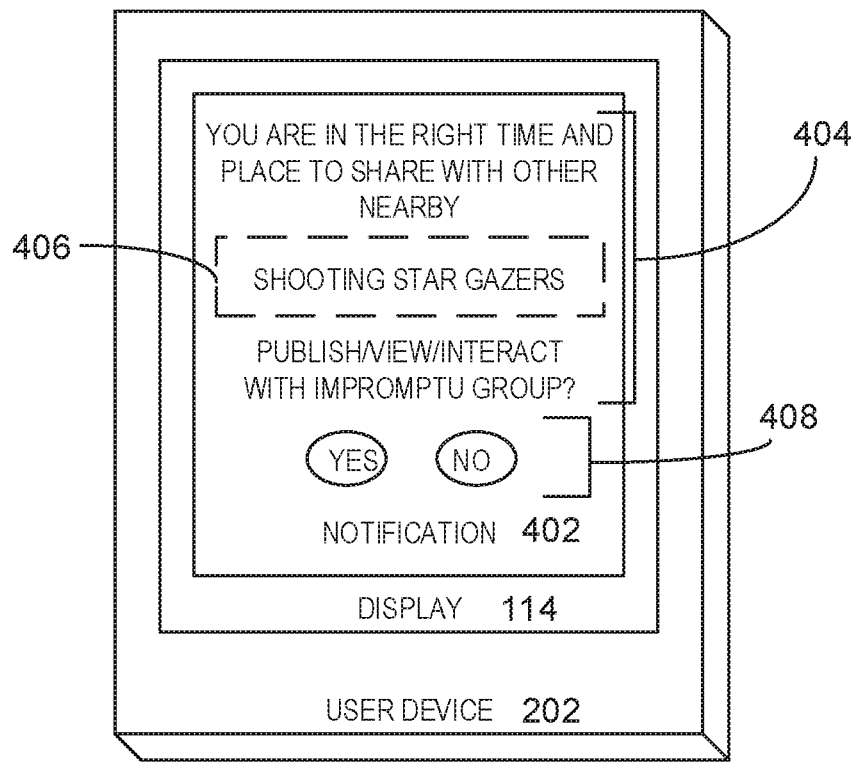
FIG. 4 is a block diagram of an example user device with a notification about the streaming impromptu community.

FIG. 4 is a block diagram of an example user device 400 with a notification about the streaming impromptu community. Like numbered items are as described in FIG. 1 and FIG. 2.

In an example, a user device 202 designated as within an IC boundary 302 can be given an IC indication which can allow a publisher 126 to stream the media instances generated and captured from the user device 202. In an example, a user operating a user device 202 may wish to be alerted to the user device's inclusion in the IC and the user may also which to have control about if they have interest in joining the IC to stream media instances, viewing other streams and media instances, or interacting with other users and streams in the IC. In an example, a computing system 100 such as a coordinating server, used for coordinating the streaming in IC, can send a notification 402 to a user device 202. In an example, the user device 202 can show the notification 402 on a display 114 of the user device, where the notification can also be audible. In an example, the notification can include explanatory text 404 as to the nature of the IC, where the explanatory text 404 can include a question or prompt for user interaction. In an example, the explanatory text 404 can include an IC title 406 that can be used to identify the IC by location, theme, or any arbitrary title that can aid a user in identifying their IC by memory or when recommending the IC to another user. In the example in FIG. 4, the IC title 406 "Shooting Star Gazers" can be a title for an IC formed around a number of user devices all capturing media about shooting stars in a particular part of a city. In this example, the event of a meteor shower, or more generally the observation of a relatively rare natural phenomenon can involve a number of user devices 202 generating media instances to share on social media. In this example, a computer system 100, may identify a spike in user device 202 activity in a certain area and send a notification to user devices 202 within a relevant IC boundary based on the activity in this area in a discrete period of time. In an example, the IC title 406 can be generated by a single user device 202 in the IC, or it can be voted on by all user devices 202 in an IC, or it can be assigned by an automated machine that reads the content of the media instances and determines a common theme.

In an example, the notification can also include an input field 408, where the user device 202 allows interaction for user feedback based on the explanatory text 404. In an example, the input field 408 display on a display 114 of a user device 202 an option of "yes" and "no" to a prompt in the explanatory text asking if the user has interest in joining, publishing, viewing, or otherwise interacting with the IC streams and users. In an example, a selection of "no" can alter the user devices 202 inclusion in the IC and can result in an indication to the publisher 126 not to publish media instances associated with that particular user device 202. In an example, a selection of "yes" can allow the application of an IC indicator showing an inclusion in the IC and allowing a publisher 126 to publish media instances to the IC stream and to other IC user devices 202.

Figure 5:
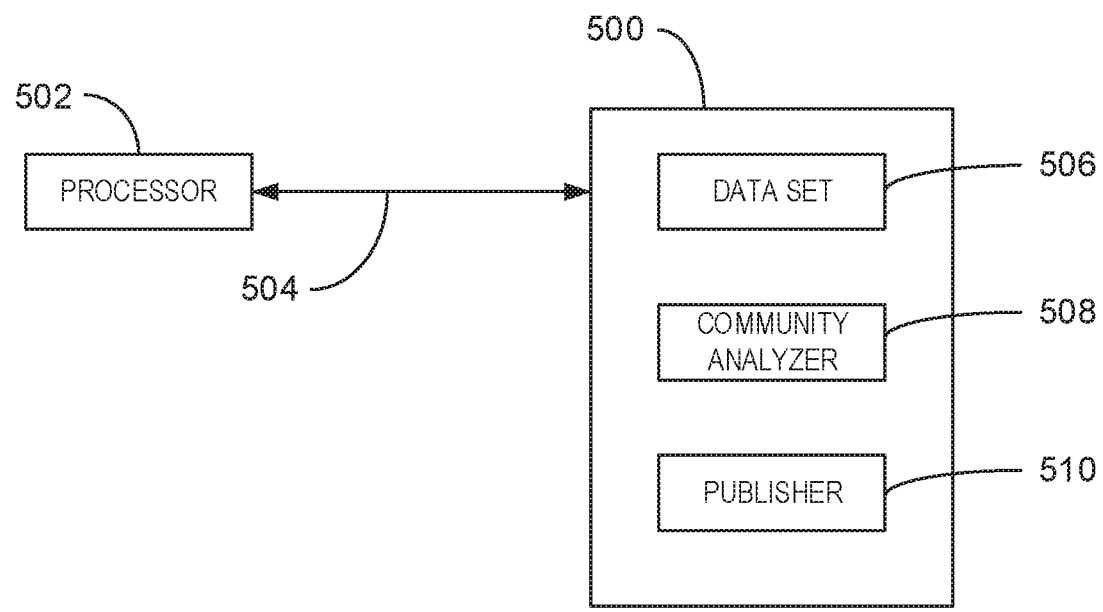
FIG. 5 is a block diagram of an example computer-readable medium for streaming an impromptu community.

FIG. 5 is a block diagram of an example computer-readable medium for streaming an impromptu community. The tangible, computer-readable storage media 500 may be accessed by a processor 502 over a computer bus 504. Furthermore, the tangible, computer-readable storage media 500 may include code to direct the processor 502 to perform the steps of the current method.

The various software components discussed herein may be stored on the tangible, computer-readable storage media 500, as indicated in FIG. 5. For example, the tangible computer-readable storage media 500 can include a data set 506. In an example, the data in a data set 506 can include data stored from a previous event, or that a computer-readable storage media 500 has received in real time from an event. In an example, the data set 506 can include a media instance, a time and location for the origin of the media instance, and an identification of an origin device or origin user of the data set or media instance. In an example, data in the data set 506 can be identified for the computer-readable storage media 500.

The computer-readable storage media 500 can also include a community analyzer 508 that can, in some examples, be at least partially made of hardware logic. The community analyzer 508 can generate an impromptu community (IC) boundary and IC indicator based on the proximity and temporality of the data sets 506. The proximity and temporality information can be generated by a comparison of data sets 506 location information compared to all the others, or compared to a historical average for a particular area or time frame. If a particular pattern for location and time can go beyond a particular threshold, it can be determined by a community analyzer 508 that an even can be occurring and can establish an IC boundary. In an example, the IC boundary can be geographic. In an example, the IC boundary can be temporal. In an example the IC boundary can be based on type of media platform, media generating device, or by artificial boundaries such as country and state lines. In an example, the community analyzer 508 can generate an IC indicator to later use in modifying the data sets 506 that originally delivered the media instance. In an example, the IC indicator can be added to data sets 506 as a means to identify which media instances can be shown in which media platforms, locations, or languages.

The computer-readable storage media 500 can also include a publisher 510 that can be at least partially made of hardware logic, to stream each media instance with an IC indicator to an origin device and an origin user.

It is to be understood that any number of additional software components not shown in FIG. 5 may be included within the tangible, computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

Figure 6:
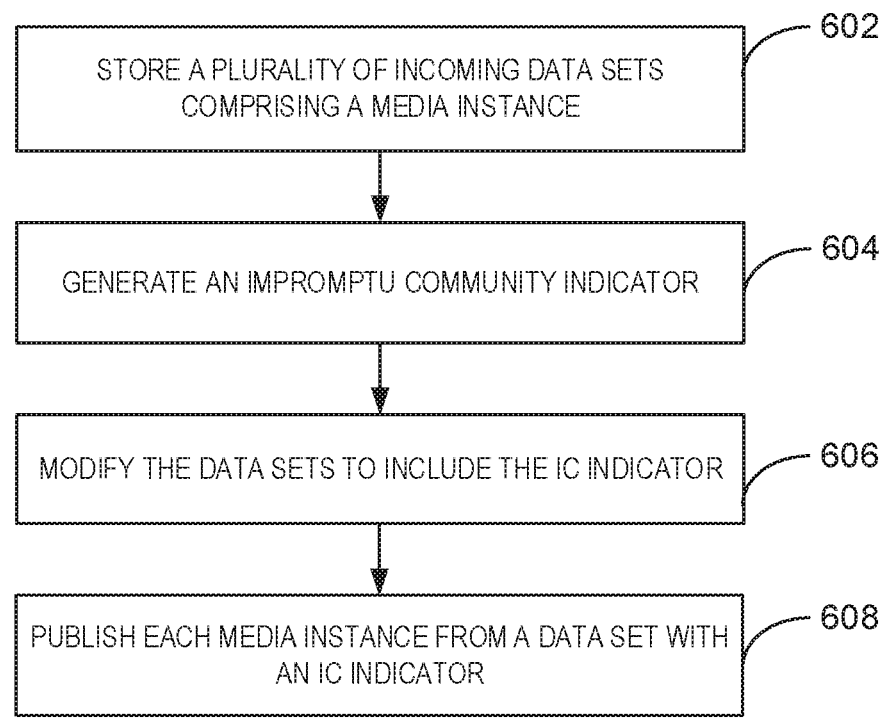
FIG. 6 is a process flow diagram of an example method for streaming an impromptu community.

FIG. 6 is a process flow diagram of an example method 600 for streaming an impromptu community. The process can begin at block 602.

At block 602, a plurality of incoming data sets comprising a media instance can be stored. In an example, these incoming data sets can be stored with a data storage device. In an example, each data set can include a time and location for the origin of the data and an identification of an origin device or origin user.

At block 604, an impromptu community (IC) indicator can be generated. In an example, the IC can be generated by an analyzer located on a data storage device and a processor. In an example, the generation of the IC analyzer can be based on proximity and temporality of a plurality of incoming data sets, each from a different user device. In an example, the identification of an IC can include aggregation and analysis of social media data. In an example, the aggregation can include identifying in real time that a cluster of active social media instances in geographic and temporal proximity to each other. In an example, there can be some threshold of a number of unique users or user devices streaming from the event or location to trigger detection.

In block 606, the data sets can be modified to include the IC indicator. In an example, the modification can include an insertion of a metadata tag or other indicator into the data set file itself. In an example, the modification can include an association of an IC indicator in a database or server that can be referenced by the data set, user device, or a computer system when a media instance approaches publishing, in order to check to determine if the media instance can be published. In an example, the modification of a data set can include the establishing of communication channels to enable publishers, streamers, and viewers to interact in real-time with each other, with others of a similar status, and with the media instances and streams themselves. In an example, the communications of the communication channels can include global text chat communication among all publishers and viewers of the event, a push-to-talk audio among viewers of a specific publishing stream, or other suitable communications. In an example, the data sets can include various media platforms and types so that the computing system can integrate across various kinds of social media including providers and services for sharing video, photos, and text.

In block 608, each media instance from a data set with an IC indicator can be streamed by a publisher. In an example, the streamed media instance can be monitored by a computer system to determine if any interactions occur to the streamed media instance. In an example the publisher can be connected to a data storage device in order to access each of the media instances stored there. In an example, the streaming of a media instance form a data set can also include the streaming of a visualization that can display among the social media streams being streamed, which streams are being watched and which ones are generating more interaction such as "likes" or "text chats." In an example, these visualizations can help viewers and streamers find the most interesting streams and media instances to view and interact with. In an example the visualization can also include a management interface for the computer system to use in managing the sequence and order the media instances, the communications, the interactions, and any other data being transmitted through the IC. In an example, this interface can include navigation tools, search functionality, related content functionality, and other suitable interface and design elements to aid a streamer or user in finding all events currently active and ready to be viewed or interacted with. In an example, the publishing of media instances includes the sharing meta data, such as viewership and 'likes' across the streams at the event, again to provide a perspective of the overall event across the individual streams from the event.

Figure 7:
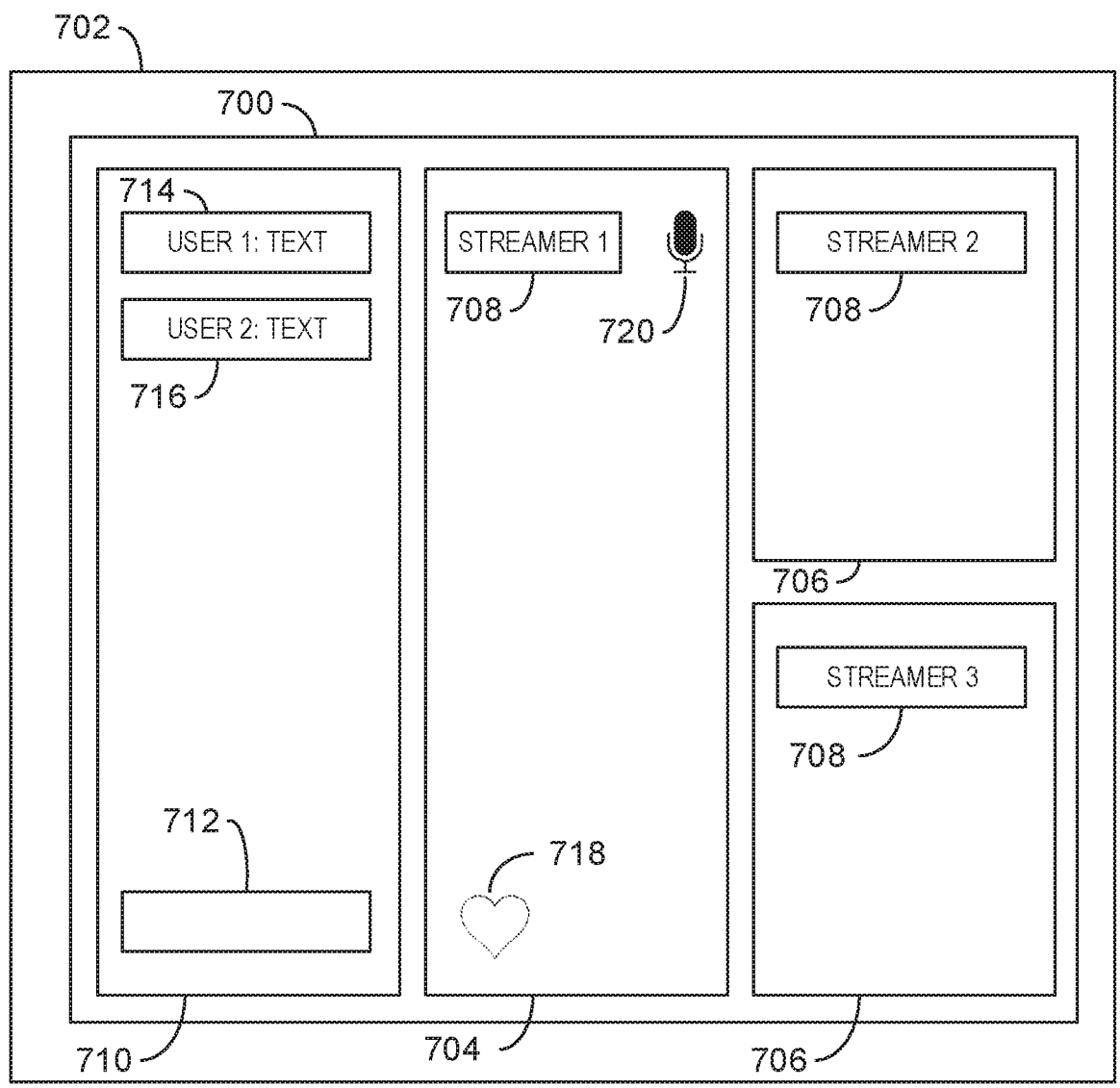
FIG. 7 is a block diagram of an example user interface for streaming an impromptu community based on time and location of the user devices.

FIG. 7 is a block diagram of an example user interface 700 for streaming an impromptu community based on time and location of the user devices doing the streaming. The visual representations shown are simplifications and can be rearranged or floated on top of one another to suit the form factor of the displaying device 702 or viewing requirements of a user.

In an example, the displaying device can show video streams and the exchanging of global messages and voice chat through a user interface 700. The user interface can include of focused panel 704. This focused panel can display a video stream shared in real time from a streamer on the ground at a particular event or area. The focused panel can be accompanied by a number of unfocused panels 706. Unfocused panels can be blurred obscured and can also be given less prominent placement but will still show at least a preview if not a full and active stream of a data set being provided by other streamers at the same event or area as the streamer of the focused panel 704. Streamers can also be referred to as broadcasters and need not only provide video streams but can also provide other suitable forms of media including text posts, image posts, audio only, media generated for social media channels, as appropriate.

When a user attempts to access the user interface of the displaying device 702, the user may be prompted to provide a username or some other identifier unique to the impromptu community to help others understand who can talk or comment through text, audio, and video. While watching the displayed content of the event, a user can switch between streams by focusing on a unfocused stream 706 by clicking or otherwise indicating a selection of an unfocused panels that can switch places with the focused panel 704. In an example, other layouts of displayed content can be used and the present disclosure of the unfocused and focused panels highlights one specific example while other configurations are also possible.

The switching of places will then project the content of the unfocused panel 706 in the focused position of the user interface 700. Each broadcaster or streamer providing the content to the various panels is identified through a stream identification area 708. The stream identification area 708 can include a text name of the broadcaster, an avatar, or another suitable symbol to identify each panel as belonging to a particular streamer or broadcaster.

A user can communicate with other viewers and the streamers through a chat box 710 where text can be entered through a keyboard or touchscreen key input in a text input box 712 and appear to a specific broadcaster or streamer or can instead be shared to an entire impromptu or can be shared publicly. Within a chat box, the username or symbol of the user can be displayed alongside the text input by the user. In an example, both the stream identification area 708 and the username shown in the text input box can have the same color, where the color will differ for each stream to indicate which stream is in the focused panel 704 at the time the user enters the text input. For example the text input for user 1 714 can match the color, e.g. blue, of the stream identification area 708 for streamer 1. Similarly, the text input for user 2 716 can be a different color, e.g. orange, and also match the color of the stream identification area 708 for streamer 2. As the color of your username in the chat box 710 can inform other viewers or chatters which stream you are watching.

A user can also send indications of interest, e.g. heart icons or other visual notifications, by selecting, clicking, or otherwise contacting the focused panel 704 generally or they can also select an interest icon 718 button that is overlaying the focused panel 704. A user can also activate push-to-to talk functionality to allow the user to briefly speak to any of the streamers the user is watching. To activate a push-to-talk functionality, the user can click or otherwise select a push icon 720 in the focused screen 704. In an example, the push icon 720 can be a word or a shape, e.g. a microphone icon, and can also be a set location or area of a user interface 700 where a user can touch or otherwise select this icon to enable push-to-talk. In an example, the push icon 720 once selected will send an input to a specific streamer or to all other viewers of the stream depending on the user interface 700 settings. In an example, an auditory cue, e.g. beep, or a visual cue, e.g. flash, will indicate when the user can begin talking for a limited time, e.g. less than 10 seconds. In some examples the user may have to wait until no other users viewing a particular stream are also live broadcasting their voice through the push-to-talk functionality for that particular stream. In an example, the user interface 700 may require that in order for the push icon 720 to be active, no other users can be active in providing voice or video while another person is also providing audio comment in a particular user interface 700. In some examples, the broadcasting of a voice through a group or a global broadcast can include the use of a headset by a user to improve sound input quality for the push-to-talk feature and to cut down on ambient noise or other sounds inadvertently picked up by the microphone of the user.

Example 1

An example system for streaming impromptu communities includes a data storage device, a community analyzer, and a publisher. In an example, the data storage device can store a number of incoming data sets, wherein each data set identifies a time and location for the origin of the data, a media instance, and an identification of an origin device or origin user. In an example, the community analyzer can operate from the data storage device to use a processor in order to calculate an IC boundary and generate an impromptu community (IC) indicator based on the proximity and temporality of the number of incoming data sets. In an example, the processor can modify the number of data sets to include the IC indicator. In an example, the publisher located on the data storage device and connected to a network interface can stream each media instance stored in the data storage device with an IC indicator to origin devices and origin users in an IC boundary. In an example, the system can include a linking manager connected to the data storage device and a network to direct the exchange of communications received at the data storage device from and to devices and users sending data sets including an IC indicator. In an example, the communications include push-to-talk audio. In an example, the publisher streams an interaction received from a device with IC indicator information by associating the interaction with a media instance for streaming. In an example, the publisher monitors streamed media instances for interactions and modifies the media instances streamed based on the interactions to reflect a number and a type of interaction associated with the streamed media instance. In an example, the system can include a linking manager, which can be connected to the data storage device and a network, to direct the exchange of communications received at the data storage device from and to a subset of devices and users sending data sets including an IC indicator, wherein the subset of devices and users can be determined based on their interactions with streamed media instances from data sets with the IC indicator. In an example, the data storage device tracks and stores data about the media instances streamed by the publisher with a time published tag. In an example, the data storage device can generate an IC event collection based on the streamed media instances, time published tag, and interactions and the publisher also can store each media instance with an IC indicator in the data storage device for access by devices with IC indicator information. In an example, the publisher can streams an interface providing an index and access system to all media instances stored in the data storage device with grouping and search functions based on IC indicators associated with each media instance.

Example 2

An example method for streaming an impromptu community can include storing, with a data storage device, a number of incoming data sets, wherein each data set identifies a time and location for the origin of the data, a media instance, and an identification of an origin device or origin user. The example method can also include generating, with a community analyzer located on a data storage device and a processor, an impromptu community (IC) indicator based on the proximity and temporality of the number of incoming data sets. The example method can also include modifying, with the processor, the number of data sets stored in the data storage device, to include the IC indicator. The example method can also include streaming each media instance with a publisher connected to the data storage device, wherein the media instance can be from a data set with an IC indicator and to monitor each streamed media instance for interactions. The example method can also include managing the exchange of communications at the data storage device both from and to devices and users sending data sets including an IC indicator. In an example, the communications can include push-to-talk audio. In an example, the publisher streams an interaction received from a device with IC indicator information by associating the interaction with a media instance for streaming. In an example, the publisher monitors streamed media instances for interactions and modifies the media instances streamed based on the interactions to reflect a number and a type of interaction associated with the streamed media instance. The example method can include monitoring the exchange of communications between a subset of devices sending the number of data sets, the communications including an IC indicator received at the data storage device, wherein the subset of devices have each interacted with streamed media instances associated with an IC indicator. In an example, the data storage device tracks and stores data about the media instances streamed by the publisher with a time published tag. The example method can include generating, with the data storage device an IC event collection based on the streamed media instances, time published tag, and interactions. In an example, the publisher streams an interface providing an index and access system to all media instances stored in the data storage device with grouping and search functions enabled based on IC indicators associated with each media instance.

Example 3

An example system for streaming an impromptu community can include a user device including a data set generator interface to generate a data set including a media instance, location of origin data, time of origin data, and user device information and a transmitter to transmit the data set to a coordinating server. The example system can also include a coordinating server including a data storage device to store the data set, a community analyzer to modify the number of data sets to include an IC indicator based on temporality and proximity of the data set to a second data set or group of data sets, and a publisher connected to the data storage device to stream each media instance with an IC indicator. In an example, the user device can receive a notification from the coordinating server that the user device can be within an IC boundary and requesting the user device send an approval signal of the adding of an IC indicator prior to the publication of a media instance.

What is claimed is:

1. A system for streaming to a community, comprising:
   a processor;
   a data storage device to store a plurality of incoming data sets from a plurality of devices, wherein each data set identifies a media instance; and
   a publisher located on the data storage device to direct the exchange of communications received at the data storage device by sharing the media instances from the plurality of devices in a single unified display to be displayed on each of the plurality of devices and include a focused panel and an unfocused panel and provide broadcaster input to viewers of the focused panel of the single unified display, wherein unfocused panel is replaced and becomes the focused panel in response to a detected panel selection.

2. The system of claim 1, wherein the focused panel displays a stream of data provided by the broadcaster and the unfocused panel provides a second stream of data provided by a user other than the broadcaster.

3. The system of claim 2, wherein the stream of data is a camera recorded video stream.

4. The system of claim 2, wherein the stream of data is at least one of a text post, an image post, an audio only post, and media generated for social media channels.

5. The system of claim 1, wherein the unfocused panel is obscured on the single unified display until the unfocused panel is switched with the focused panel in response to a detected panel selection.

6. The system of claim 1, wherein the unfocused panel switching with the focused panel refers to the switching of their positional locations on the single unified display.

7. The system of claim 1, wherein the single unified display comprises the focused panel, the unfocused panel, and a chat box for text entry by users.

8. A method for streaming to a community, comprising:
   directing the broadcasting of a plurality of incoming data sets from a plurality of devices, wherein each data set identifies a media instance; and
   exchanging communications received at a data storage device with the plurality of devices, wherein the communications comprise a single unified display to be displayed on each of the plurality of devices;
   generating a focused panel and an unfocused panel to separate broadcaster input provided to viewers in the focused panel of the single unified display from an unfocused panel; and
   replacing the focused panel with the unfocused panel which becomes focused in response to a detected panel selection.

9. The method of claim 8, wherein the focused panel displays a stream of data provided by the broadcaster and the unfocused panel provides a second stream of data provided by a user other than the broadcaster.

10. The method of claim 9, wherein the stream of data is a camera recorded video stream.

11. The method of claim 9, wherein the stream of data is at least one of a text post, an image post, an audio only post, and media generated for social media channels.

12. The method of claim 8, wherein the unfocused panel is obscured on the single unified display until the unfocused panel is switched with the focused panel in response to a detected panel selection.

13. The method of claim 8, wherein the unfocused panel switching with the focused panel refers to the switching of their positional locations on the single unified display.

14. The method of claim 8, wherein the single unified display comprises the focused panel, the unfocused panel, and a chat box for text entry by users.

15. A system for streaming to a community, comprising:
    a broadcaster device comprising:
    a processor;
    a data storage device to store a plurality of incoming data sets from a plurality of devices, wherein each data set identifies a media instance; and
    a publisher located on the data storage device to direct the exchange of communications received at the data storage device by sharing the media instances from the plurality of devices in a single unified display to be displayed on each of the plurality of devices and include a focused panel and an unfocused panel and provide broadcaster input to viewers of the focused panel of the single unified display, wherein unfocused panel is replaced and becomes the focused panel in response to a detected panel selection.

16. The system of claim 15, wherein the focused panel displays a stream of data provided by the broadcaster and the unfocused panel provides a second stream of data provided by a user other than the broadcaster.

17. The system of claim 16, wherein the stream of data is a camera recorded video stream.

18. The system of claim 15, wherein the unfocused panel is obscured on the single unified display until the unfocused panel is switched with the focused panel in response to a detected panel selection.

19. The system of claim 15, wherein the unfocused panel switching with the focused panel refers to the switching of their positional locations on the single unified display.

20. The system of claim 15, wherein the single unified display comprises the focused panel, the unfocused panel, and a chat box for text entry by users.

* * * * *